United States Patent [19]
Adahan

[11] 3,790,228
[45] Feb. 5, 1974

[54] BRAKE PRESSURE MODULATOR
[76] Inventor: Carmeli Adahan, 1930 Vine, No. 303, Berkeley, Calif. 94709
[22] Filed: Aug. 11, 1972
[21] Appl. No.: 279,934

[52] U.S. Cl.............................. 303/21 F, 188/181 A
[51] Int. Cl............................................. B60t 13/68
[58] Field of Search....................... 303/21 F, 61–63, 303/68–69, 10, 6 C; 188/181; 137/DIG. 2; 138/45, 46, 40

[56] References Cited
UNITED STATES PATENTS

| | | | |
|---|---|---|---|
| 2,500,750 | 3/1950 | Halenza | 138/45 |
| 3,467,441 | 9/1969 | Clark | 303/61 |
| 3,515,440 | 6/1970 | Every et al. | 303/21 F |
| 3,536,362 | 10/1970 | Davis | 303/68 |
| 3,588,189 | 6/1971 | Cumming | 303/21 F |
| 3,597,012 | 8/1971 | Packer | 303/21 F |
| 3,666,328 | 5/1972 | Williams | 303/61 |

Primary Examiner—Duane A. Reger
Assistant Examiner—D. C. Butler
Attorney, Agent, or Firm—Irvin L. Groh

[57] ABSTRACT

A brake pressure modulator for use in a skid control system in which a sliding plunger controls communication between the master cylinder and the wheel cylinders and also the release and reapplication of brake pressure in response to signals indicating the presence or absence of a potential wheel locked condition. The plunger is supported for movement by a diaphragm assembly in a manner permitting rapid response to differential pressures acting thereon; the differential pressure following release of the brakes in response to an impending wheel lock signal being governed to provide an initially rapid rise in brake pressure which is followed by a more gradual rise at a rate which reflects the surface conditions on which the vehicle is being operated.

10 Claims, 4 Drawing Figures

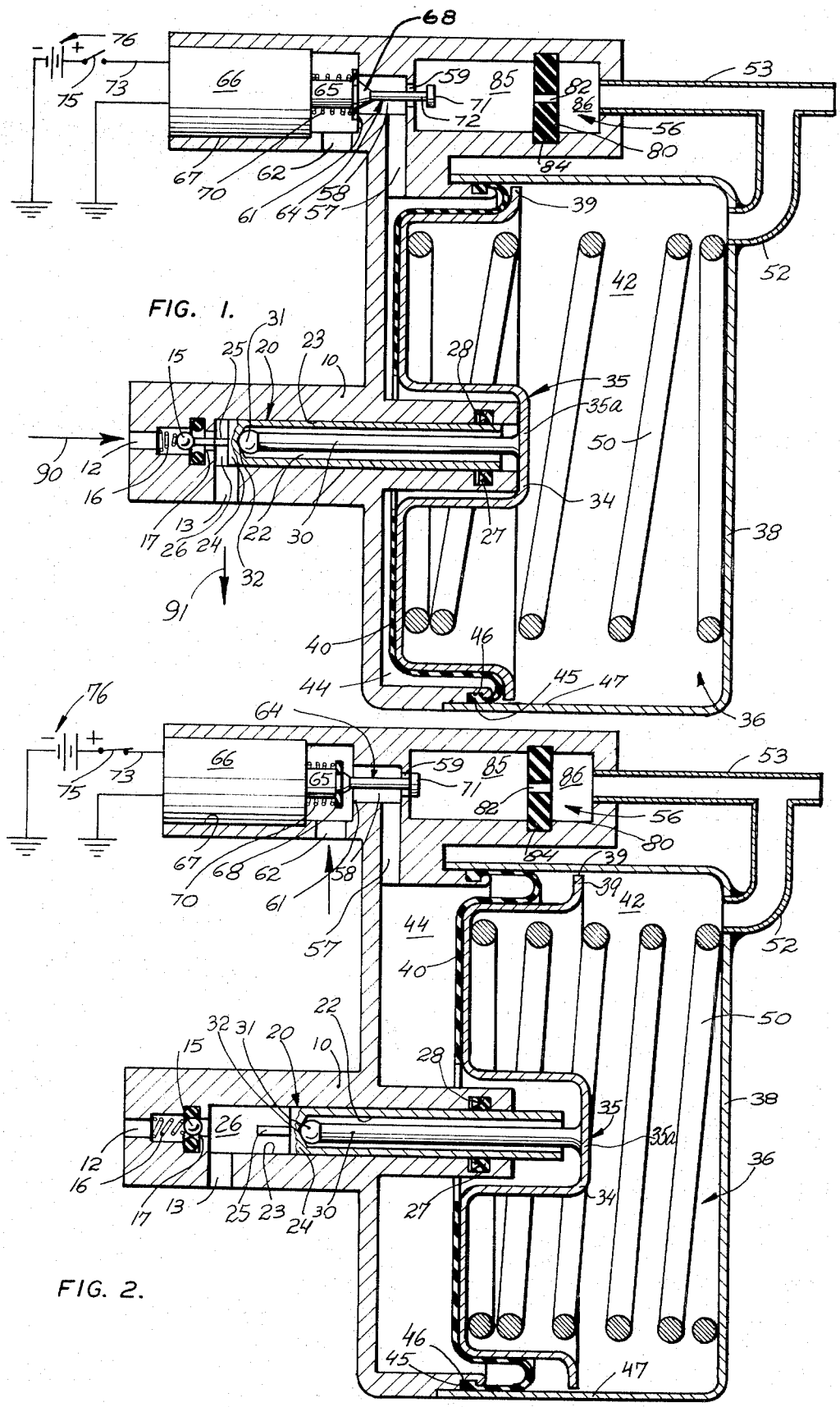

BRAKE PRESSURE MODULATOR

BACKGROUND OF THE INVENTION

1. Field of the Invention

This invention relates to skid control systems for hydraulic brake systems on vehicles and more particularly to brake pressure modulators for use in such systems which are actuated in response to control signals from a skid detecting device.

2. Description of the Prior Art

Usual forms of devices for modulating hydraulic brake pressure in response to signals from a skid control circuit employ a plunger disposed in the hydraulic brake circuit which is reciprocated in response to vacuum or air operated diaphragm assemblies under the control of valves which respond to signals indicating impending wheel lock or resumption of wheel rotation. Under usual conditions, the plunger is positioned to permit free communication between a conventional master cylinder and the wheel cylinders which transfer the hydraulic braking force to the brake mechanisms at the wheels. Upon receiving a signal indicating an impending wheel lock, the master cylinder and the controlled wheel cylinder are isolated from each other and the pressure at the wheel cylinder is relieved to avoid wheel lock. Once the impending wheel lock condition has been alleviated, the plunger is returned in the opposite direction by the diaphragm assembly to increase the brake fluid pressure at the wheel cylinder to reapply the brakes. Examples of such pressure modulator systems are disclosed in U.S. Pat. Nos. 3,306,677, 3,515,440, 3,586,386 and 3,597,012.

Pressure modulators of the above type have generally been found to suffer from several disadvantages. Under actual operating conditions, the operating parameters of the modulator (e.g., mechanical response time of the plunger-diaphragm assembly, pressure differential across the diaphragm, and brake fluid pressure in the wheel cylinder lines) frequently cause the plunger to be retracted beyond the required axial distance. This excessive retraction of the plunger results in a correspondingly excessive drop in brake fluid pressure. In extreme cases this pressure drops below atmospheric pressure, permitting air to enter the wheel cylinder fluid system through the commonly employed seals found in most commercially available wheel cylinders. The dangers attendant on this condition can well be appreciated by those skilled in the art.

A further disadvantage found in prior art pressure modulators of the above noted type stems from the manner in which the plunger is reciprocated by the diaphragm assembly. In some pressure modulators, the plunger is fastened directly to the diaphragm assembly and in others, the plunger is separate from but in abutting relationship to the diaphragm assembly. In both types of pressure modulator, the application of differential pressure to the diaphragm assembly often results in a tilting of the diaphragm assembly and the transfer of a nonaxial component of force to the plunger. Such nonaxial forces can cause the plunger to bind in its cylinder bore and, under extreme conditions, can cause the plunger to jam and cause failure of the braking system. To avoid such problems, it often is necessary to provide the plunger with widely spaced bearings which makes for a more expensive unit and can result in an increased length of the unit which is undesirable, particularly on vehicles where space is at a premium.

Still another disadvantage found in prior art pressure modulators lies in the manner in which brake fluid pressure is restored by the reciprocating plunger after the incipient wheel lock condition has been alleviated. In many such devices, the plunger is quickly extended to the normal position thereby restoring full brake pressure to the wheel brake cylinders in an extremely short period of time. This in turn leads quickly to another incipient wheel lock condition which, under many road conditions, can be more aggravated than that originally encountered.

SUMMARY OF THE INVENTION

It is an object of the invention to provide a brake fluid pressure modulator in which the modulating plunger is free to move with a minimum of interference so that wear and friction are kept low to reflect the various changes in pressure differential imposed on the diaphragm assembly in response to skid control signals.

A further object of the invention is to provide a brake fluid pressure modulator in which the pressure differential applied to the modulator plunger and diaphragm assembly to reapply the brakes following release of the brakes in response to a skid signal, results in an initially rapid brake pressure increase followed by a gradual rate of increase which is dependent on the traction surface afforded by the surface on which the vehicle is being operated.

Still another object of the invention is to provide a brake pressure modulator which prevents releasing the brake pressure to a level at which air can enter the lines of the brake system and in which the pressure can be reapplied to the brakes after an incipient wheel lock condition has been alleviated at a rate which prevents aggravated incipient wheel lock conditions.

The brake pressure modulator by which the improved operating conditions are attained includes a plunger and diaphragm assembly arrangement which eliminates binding or jamming of the plunger so that it can respond very rapidly and accurately to pressure differential changes which are imposed on the diaphragm assembly. In turn, the pressure differential applied to the diaphragm assembly is governed by a pressure responsive flow restricting device which, upon reapplication of the brakes following a skid control signal causes the plunger to be extended at a rate corresponding to the surface conditions on which the vehicle is being operated.

For a fuller understanding of the nature and advantages of the invention, reference should be had to the following detailed description taken in conjunction with the accompanying drawings.

BRIEF DESCRIPTION OF THE DRAWINGS

FIG. 1 is a sectional view of the brake pressure modulator embodying the invention with the parts in their normal position;

FIG. 2 is a view similar to FIG. 1 but with the parts occupying positions when brake pressure is being relieved;

DETAILED DESCRIPTION

Figures 3, 4:
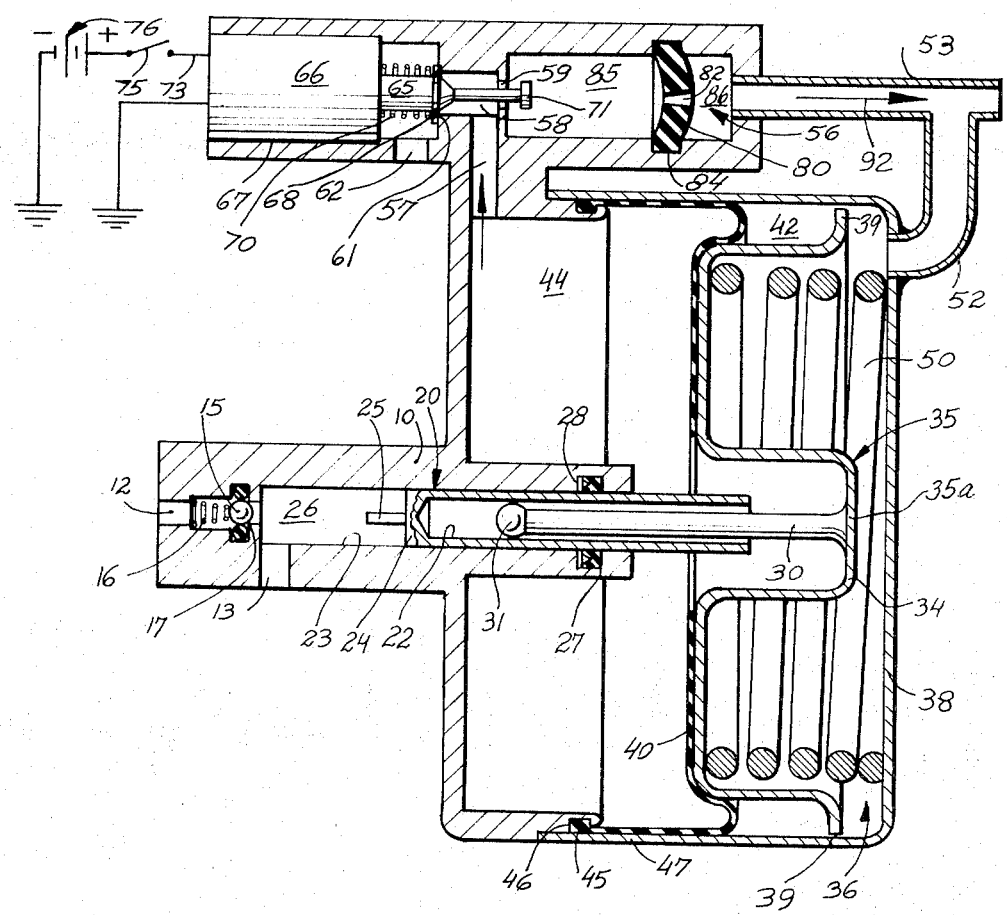
FIG. 3 is another view similar to FIGS. 1 and 2 but with parts occupying positions just prior to reapplication of brake pressure.
FIG. 4 is a graph of brake pressure as a function of time, illustrating in a general way, the variations of brake pressures when an incipient wheel lock is encountered.

The pressure modulator embodying the present invention includes a housing with an irregularly shaped main body portion 10 having a fluid inlet 12 adapted to be coupled to the hydraulic master cylinder of a vehicle braking system and a fluid outlet 13 adapted to be coupled to one or more conventional wheel cylinders which apply brake mechanism associated with the wheels of the vehicle. The various components of the brake system are conventional and are not shown. Interposed between the inlet 12 and the outlet 13 is a ball check valve 15 biased by a spring 16 toward an annular valve seat 17.

A plunger 20 having an axially extending blind bore 22 is slidably mounted in a bore forming a cylinder 23 in the main body portion 10. The plunger 20 has a solid end wall portion 24 from which a finger 25 projects through the annular valve seat 17 when the parts are disposed in the position shown in FIG. 1. Under such conditions, finger 25 engages ball check valve 15 and maintains it off its annular seat 17 to provide communication from the inlet 12 to the outlet 13 through a brake fluid control cavity 26 formed in the cylinder 23.

A cup-shaped seal 27 is located in an internal groove 28 adjacent the open end of the cylinder 23 and provides a fluid tight but sliding seal between the plunger 20 and the cylinder 23. Disposed within the blind bore 22 of the plunger 20 is an operating rod 30 having a rounded free end 31 normally in contact with an inner end wall of the blind bore 22. The opposite end of the operating rod 30 is connected to a central portion 34 of a piston-like diaphragm assembly generally designated at 35. The outer diameter of the operating rod 30 is substantially smaller than the internal diameter of the blind bore 22 to provide ample clearance between the plunger 20 and the rod 30.

Diaphragm assembly 35 is slidably disposed within a generally cylindrical enclosure 36 formed by a cup-shaped end cap 38 and the main body portion 10. The diaphragm assembly 35 includes a diaphragm plate 35a to which the rod 30 is attached and a flexible diaphragm 40 which divides the enclosure 36 into a pair of chambers 42 and 44. The diaphragm 40 is provided with a circumferential bead 45 which is clamped into a peripheral groove 46 of the main body portion 10 by the internal side wall portion 47 of the end cap 38 to form a fluid tight seal between opposite sides of the diaphragm 40. The radially inner portion of the diaphragm 40 may be secured by any suitable means to the diaphragm plate 35a although the pressure differential to which the diaphragm assembly is subjected during operation will normally maintain the diaphragm 40 in sealing engagement with the diaphragm plate 35a.

Diaphragm plate 35a is urged to the left, as viewed in the drawings, by a compression spring 50 which is disposed in the chamber 42 with one end against the diaphragm plate 35a and the other end engaging the internal wall of the end cap 38. Spring 50 supplies sufficient force to maintain the diaphragm plate 35a and the diaphragm 40 in the position shown in FIG. 1 against the maximum hydraulic pressure which may act in the cavity 26 on the plunger 20.

Chamber 42 is connected by way of a conduit 52 to a supply or source conduit 53 which in turn is connected to a suitable source of vacuum such as a vacuum tank or the intake manifold of a vehicle engine. Chamber 42 also is connected by way of the supply conduit 53 with a cavity 56 formed in the body portion 10.

The chamber 44 at the opposite side of the diaphragm assembly 35 is connected by way of a radially extending passage 57 in the body portion 10 to a valve chamber 58 which is in communication with the cavity 56 by way of an opening 59. The valve chamber 58 also communicates through an opening or venting aperture 61 with an air inlet port 62 which is open to the atmosphere.

A compound valve member 64 is mounted on an armature 65 of a solenoid 66 which is supported in a solenoid mounting aperture 67 in the main body portion 10. The valve member 64 has a generally conical inlet or air valve portion 68 which is adapted to engage and close the opening 61 and is normally urged to that position by a return spring 70. A supply or vacuum valve element 71 is formed on the end of a valve spindle 72 which projects through the opening 59. The valve element 71 is dimensioned to close the opening 59 when the compound valve member 64 is moved to the position in which it is seen in FIG. 2 upon energizing solenoid 66.

Solenoid 66 is provided with a control input lead 73 which is adapted to be coupled to a source of control signals. For simplicity, this control signal source is shown as a switch 75 coupled to a DC power source 76. Solenoid 66 may be controlled by any one of a number of known skid control circuits which provide control signals indicating incipient wheel lock of one or more wheels. Skid control circuits of this type produce an incipient wheel lock control signal for actuating solenoid 66 whenever the associated wheel is approaching a locked or non-rotating state while it is being brakes. U.S. Pat. Nos. 3,511,542 and 3,584,921 disclose skid control circuits which are suitable for this purpose.

A flexible, flow restricting element 80 having a central aperture 82 is mounted in a groove 84 formed in the cavity 56 and divides the latter into a relatively larger control or expansion chamber 85 and a smaller chamber 86. The flow restricting element 80 regulates the rate at which pressure in the chambers 85 and 86 at opposite sides of the element 80 can be equalized. As best shown in FIG. 3, when these pressures are unequal the differential pressures cause the element 80 to flex in the direction of the lower pressure and such deflection results in constriction of the central aperture 82. The greater the pressure differential across element 80, the greater amount of deflection and, consequently, the greater constricting of the aperture 82 and the slower the rate of fluid flow through the aperture 82.

In operation with vacuum present in the supply conduit 53 and with solenoid 66 de-energized, the chambers 42 and 44 are at equal vacuum or subatmospheric pressure and the spring 50 maintains the diaphragm assembly 35 formed by the diaphragm plate 35a and the diaphragm 40 in the position in which it is shown in FIG. 1. As a result, operating rod 30 is moved fully to the left together with the plunger 20 so that the finger 25 projects through the valve opening 17 and holds the ball check valve 15 in the unseated position. Under such conditions, actuation of the master cylinder of the vehicle braking system results in fluid pressure being transferred through inlet 12, control cavity 26 and outlet 13 in the direction of arrows 90 and 91 to the associated wheel cylinder. Under normal brake operating conditions, the various components will occupy and remain in the position shown in FIG. 1 during application and release of the brakes.

When an incipient wheel lock condition is sensed, switch 75 is closed to energize solenoid 66 which results in movement of compound valve member 64 to the left to open valve opening or seat 61 and close opening 59. This places the chamber 44 in communication with the atmosphere by way of conduit 57, valve chamber 58, valve opening 61 and port 62. At the same time, the control cavity 56 as well as the chamber 42 are isolated from the chamber 44. Under these conditions, the pressure in chamber 42 is at a relatively constant low or subatmospheric pressure and the pressure in chamber 44 is relatively higher since it has been increased by the admission of atmospheric air. Consequently, chamber 42 may be considered to be a constant pressure chamber and chamber 44 a variable pressure chamber.

Changing the pressure in variable pressure chamber 44 results in a pressure differential urging the diaphragm assembly 35 toward the right against the biasing action of the spring 50. The pressure differential plus the braking pressure existing in the cavity 26 acting on the plunger 20, assists in overcoming the force of the spring 50. Since operating rod 30 retracts with the diaphragm assembly 35, the fluid pressure acting on the plunger 20 causes it to slide to the right in the cylinder 23 while maintaining the ball end 31 in abutment with end wall of the plunger bore 22. After plunger 20 retracts a predetermined axial distance, ball check valve 15 seats on the annular valve seat 17 to isolate outlet 13 and the associated wheel cylinder from the inlet 12 which is connected to the master cylinder.

Referring now to FIG. 2, after ball check valve 15 has seated to close the valve seat 17, the pressure fluid at the wheel cylinder, which also exists in the cavity 26, acts on the plunger 20 to move it to the right and to enlarge the volume of the cavity 26 until the hydraulic brake pressure is fully relieved or until solenoid 66 is de-energized by opening switch 75. When the latter condition occurs, spring 70, aided by the vacuum in the control cavity 56 acting on the valve head 71 returns the compound valve member 64 to the position shown in FIG. 1 thereby reestablishing communication between the variable pressure chamber 44 and the source of vacuum by way of the conduit 53. As the pressures in the chambers 42 and 44 equalize, spring 50 urges diaphragm assembly 35 and operating rod 30 to the left. The free end 31 of the operating rod 30 acts on the inner end wall of bore 22 of the plunger 20 and moves it to the left in the cylinder 23 to increase the brake fluid pressure in the cavity 26 and therefore at the associated wheel cylinder. In the absence of the second skid control signal energizing solenoid 66, plunger 20 will reach the position illustrated in FIG. 1 and the finger 25 will engage and unseat the ball check valve 15 thereby opening inlet 12 to outlet 13 and reestablishing brake communication between the master cylinder and restoring full braking pressure in the braking system. It should be understood, however, that before the plunger 290 reaches the position shown in FIG. 1, the solenoid 66 may be energized again in response to another skid signal which causes retraction of the diaphragm assembly 35 and plunger 20, as previously described.

FIG. 3 illustrates the relative positions of the various elements of the preferred embodiment of the invention when the solenoid 66 is de-energized after having been energized for a period of time greater than would be required to fully relieve the brake fluid pressure. This situation frequently occurs on slippery roads with packed snow or ice. Immediately prior to solenoid 66 becoming de-energized, operating rod 30, diaphragm plate 35a and diaphragm 40 will have been retracted by the differential pressure in chambers 42 and 44 beyond the point at which brake fluid pressure is fully relieved. Due to the one way connection between plunger 20 and operating rod 30, the latter is free to continue its movement to the right without forcing plunger 20 to follow. Stated otherwise, because the end 31 of the operating rod 30 is free to slide within the plunger bore 22, the plunger 20 moves to and remains in the position at which the brake fluid pressure in the associated wheel cylinder is fully relieved but the rod 30 is free to continue its movement independently of the plunger 20. Since plunger 20 cannot be forceably retracted beyond this position, the brake fluid pressure cannot be reduced to a dangerously low value at which the brake pressure may be less than atmospheric pressure.

A further advantage stems from the operative association between plunger 20, operating rod 30, and diaphragm plate 35a. As best shown in FIG. 3, once retracted, plunger 20 can only be extended in the pressurizing direction (i.e., toward inlet 12) by operating rod 30. As has been described above, this is accomplished by contacting working end 31 of operating rod 30 with the end wall of plunger bore 22 as seen in FIG. 2 and thereafter moving operating rod 30 to the left toward the position shown in FIG. 1. The force on the diaphragm assembly 35a is applied by operating rod 30 to plunger 20 at the end within the cylinder 23. This is to be contrasted with prior art devices wherein the force is applied at the opposite end of the plunger, i.e., the end protruding from the diaphragm end of cylinder 23. In such prior art devices, the tendency of the spring 50 to tilt or cock the the diaphragm plate introduces a substantial nonaxial component of force on the protruding end of the plunger. This has been known to cause severe binding of the plunger in the cylinder bore and, in extreme cases, complete jamming rendering the plunger inoperative. Moreover, even slight binding of the plunger in its cylinder induces frictional loads which detract from the free and easy reciprocation of the plunger which is required for proper response to pressure differentials acting on the associated diaphragm assembly.

This adverse condition is eliminated in pressure modulators constructed according to the invention. A clearance is provided between the flange 39 of the diaphragm plate 35a and the inner surface of the side wall 47 which is less than the clearance between the operating rod 30 and the plunger bore 22. In the event that the diaphragm assembly 35 tilts, only the rod end 31 can contact the plunger 20 by engaging the end wall of the bore 22, as seen in FIGS. 1 and 2 or the side walls of the bore 22 as seen in FIG. 3. The rod 30 may actually be misaligned with the axis of the plunger 20 without adverse affect and the force of the diaphragm assembly 35 will be transmitted to the brake fluid only when the rod end 31 contacts the end wall of the plunger bore 22 and then at a point very near to the brake fluid in cavity 26 rather than at the opposite end of the plunger 20. As a result, the present modulator unit avoids the prooblem of binding of the plunger 20 and at the same time, has a smaller overall length than known devices which is an advantage in most vehicle arrangements where mounting space is at a premium.

Returning now to the operation of the modulator unit and, particularly to the control of the differential pressures acting on the diaphragm assembly 35; under the initial conditions shown in FIG. 1, the pressures in the chambers 42 and 44 are substantially equal. Thereafter, energizing solenoid 66, as described above, moves the valve member 64 to the position shown in FIG. 2 and results in a pressure increase in chamber 44 while the pressure in chamber 42 and the cavity 56 remains substantially constant. Following this, when solenoid 66 is de-energized, communication is reestablished between the chamber 44 and the cavity 56. Since the pressure in cavity 56 is substantially equal to the pressure in the source conduit 53, the pressure in the chamber 42 and in the control chamber 85 formed to the left of the flow restricting element 80, quickly equalize. This results in a substantially instantaneous reduction in the pressure in the variable pressure chamber 44. As a result, diaphragm assembly 35 is quickly moved to the left by the compression spring 50 to instantaneously increase brake pressure. Once the pressure in chamber 44 and the control chamber 85 are equalized, however, the further reduction in pressure in the variable pressure chamber 44 is governed by the flow restricting element 80.

At the same time that the pressure in chamber 44 is being instantly decreased, the pressure in the control chamber 85 is being instantaneously increased to cause a flexing of the flow restricting element 80, as illustrated in FIG. 3. The pressure differential between control chamber 85 and chamber 86 which communicates with the supply conduit 53 causes the element 80 to flex in the direction of the lower pressure indicated by the arrow 92, thereby constricting central aperture 82. The greater the pressure differential across the element 80, the greater its deflection and the smaller the aperture 82 becomes. Since the size of the aperture 82 determines the rate at which the pressure in chambers 42 and 44 can equalize, a high pressure differential and small orifice 82 results in slow equalization whereas, a lower pressure differential and, consequently, larger orifice 82 results in a more rapid equalization of pressures. The rate of equalization of the pressures in the chambers 42 and 44 determines the rate at which the diaphragm assembly 35 is permitted to return under the urging of spring 50 toward its normal position illustrated in FIG. 1.

FIG. 4 illustrates the modulation of brake pressure by the reciprocation of the plunger 20 resulting from the changes of differential pressure on the diaphragm assembly 35 as regulated by the flow restricting element 80. The curves illustrate the variation of brake fluid pressure over a period of time with the solid line curve illustrating the type of condition which might occur on an icy surface which affords a low coefficient of friction with the braked wheel and a broken line curve illustrating the condition that might be experienced on a dry surface offering a higher coefficient of friction.

Braking which results in a potential wheel locking signal energizes the solenoid 66 to release the brakes at point 93 in the case of the icy road condition, and at point 93' in the case of the dry road condition. In both cases, the pressure is relieved relatively rapidly until the braked wheel is restored to a rotational speed at which the solenoid will be energized as depicted on the curves at points 94 and 94'. Initially, de-energizing of solenoid 66 after the brake pressure has been relieved as a result of a wheel locking signal, there is an instantaneous pressure rise to points 95 and 95'. Thereafter, the braking pressure is restored at a relatively slower rate between the points 95 and 96 on icy road surfaces and between points 95' and 96' on dry road surfaces. The points 96 and 96' represent the points at which the solenoid 66 is again energized as a result of another impending wheel lock which brings about the brakes until wheel rotation is restored.

Although the curves display generally the same operating characteristics, it is important to note some critical differences. The time period between point 93 and point 94 is substantially longer than the period between point 93' and 94'. These time periods represent the length of time that the solenoid 66 is energized to release the brakes in response to a potential wheel locking condition. In the case of the icy road surface, the solenoid is energized for a relatively long period of time because the slippery surface resists restoring the wheel to a satisfactory rotational speed at which the solenoid would become de-energized. Because of the relatively long period of time that the solenoid remains energized on an icy surface, the pressure in chamber 44 is reduced to a lower value than it would be under a dry road condition. The reduction of pressure in chamber 44 to a low value results in a high pressure differential acting on the diaphragm assembly 35 and the reduction of brake pressure to a relatively low value. The magnitude of the pressure differential acting on the diaphragm 35 is directly related to the magnitude of the pressure differential acting on the flow restricting element 80 after the pressures in the chamber 44 and the control chamber 85 become equalized during the instantaneous pressure rise between the points 94, 95 and 94', 95'. Under icy road conditions, the differential pressure acting on the element 80 is great and the orifice 82 is small whereas, on dry pavements, the pressure differential is lower and the orifice 82 is larger. Because of this, after the instantaneous pressure rise to the points 95 and 95', the rate of increase of brake pressure is low on the icy road surfaces whereas, it is much faster on dry road surfaces as illustrated by the curves between the points 95 and 96 and between the points 95' and 96'. This is a highly desirable characteristic to achieve which can be appreciated when one considers that it is difficult on icy surfaces to bring about rotation of the wheels once the wheel has stopped rotating. Consequently, it is important to reapply the brakes slowly to avoid having the wheel becoming locked. By comparison, on the dry road surface, restoring the rotation of the wheel is more easily accomplished because of the higher coefficient of friction and, as a consequence, it is desirable to reapply the brakes more rapidly towards a point at which another impending wheel lock signal may be developed. It will be appreciated that the relatively slow rate of pressure increase between the points 95 and 96 on an icy road surface and the relatively faster rate of pressure increase between the points 95' and 96' on a dry road surface illustrate two extreme conditions and that a curve illustrating some intermediate condition would have a pressure increase at some intermediate rate. In summary, the rate of pressure increase at the brake is low on a slipper surface and it increases as the coefficient of friction between a road surface and the wheel increases.

The variable rate of pressure reapplication provided by the invention eliminates at least two adverse conditions which have been observed in some prior art devices. First, due to the finite response time of the mechanical elements when the solenoid 66 is de-energized, the diaphragm assembly 35 cannot come to an immediate stop after the brake pressure has been relieved to a desired level and continues to move in the retracting direction for a short period of time. The additional movement of the diaphragm assembly must be traversed in the opposite direction for reapplication of the brakes and delays the reestablishment of brake pressure at the wheel cylinder. By providing an initial rapid or instantaneous rate of equalization between the variable pressure chamber 44 and the control chamber 85, the time within which this lost motion is absorbed is greatly reduced. Second, by regulating the rate at which brake pressure is reapplied in the range between points 95, 96 and 95', 96', as shown in FIG. 4, in accordance with road surface condition, so that the rate of pressure increase is reduced in proportion to a reduction in the traction surface, the incident of premature wheel lock-up is greatly reduced. By increasing the time between incipient wheel lock conditions, the effective braking distance is correspondingly reduced.

It will now be seen that there has been provided a brake pressure modulator which responds rapidly and accurately to pressure differentials on a diaphragm assembly and in which the pressure differentials during brake reapplication are regulated in a manner to provide an initially instantaneous rise in brake pressure followed by a more gradual rise at a rate which is dependent on the type of road surface on which the vehicle is being operated.

While a particular embodiment of the invention has been shown and described, various modifications thereof will be apparent to those skilled in the art and it is therefore not intended that the invention be limited to the disclosed embodiment of details thereof. Further departure may be made therefrom within the spirit and scope of the invention as defined in the claims.

What is claimed is:

1. A pressure modulator for controlling the fluid pressure in a braking system comprising; a housing having an internal bore terminating in an enclosure; a plunger slidably mounted in said internal bore, said plunger having an operating end portion forming a brake fluid receiving chamber in said bore, said plunger being movable for varying fluid pressure in said chamber, said plunger forming a longitudinally extending bore terminating in a wall internally thereof and adjacent to said chamber; a diaphragm assembly reciprocably mounted in said enclosure; means for reciprocating said diaphragm assembly in response to the generation of control signals, and an operating rod coupled to said diaphragm assembly and having a free end portion, said operating rod being slidably received by said bore of said plunger for movement independently thereof with the free end portion thereof adapted to contact said wall for extending said plunger in a direction in said internal bore tending to increase said fluid pressure in said chamber and being movable in the opposite direction to separate from said wall for movement of said diaphragm assembly a greater distance than said operating end portion.

2. The apparatus of claim 1 wherein said rod is movable angularly relative to its axis and wherein said diaphragm assembly includes a diaphragm and a diaphragm plate connected together, said diaphragm plate having a peripheral flange portion, the maximum clearance between said peripheral flange portion and the inner surface of said enclosure being no greater than the maximum clearance between the outer surface of said operating rod and the inner surface of said plunger bore to limit angular displacement of said rod relative to the axis of said plunger.

3. The apparatus of claim 2 wherein said free end portion has a spherical shape affording axial contact of said wall with said rod upon angular displacement of the latter.

4. The apparatus of claim 1 wherein said diaphragm assembly divides said enclosure into first and second fluid pressure chambers at opposite sides of said diaphragm assembly and wherein said reciprocating means comprises a vacuum source, means for normally communicating said pressure chambers to said vacuum source, and a compound valve means for venting said first pressure chamber to ambient fluid pressure and interrupting communication between said first pressure chamber and said vacuum source in response to the generation of at least one of said control signals.

5. The apparatus of claim 4 wherein said compound valve means comprises a venting aperture, a first valve means for normally closing said venting aperture, a vacuum aperture, second valve means for normally opening said vacuum aperture, a control cavity communicating with said apertures and said first pressure chamber, and means for operating said first and second valve means to an alternate position wherein said venting aperture is open and said vacuum aperture is closed.

6. The apparatus of claim 4 further including an expansion chamber in fluid communication with said first pressure chamber and a flow restricting member for providing fluid communication between said expansion chamber and said second pressure chamber, said flow restricting member having a flow orifice for providing a variable flow rate which decreases as the pressure differential across said member increases.

7. The apparatus of claim 6 wherein said flow restricting member comprises a flexible partition mounted at the end of said expansion chamber in communication with said second pressure chamber.

8. An apparatus for controlling the rate of application of fluid pressure in a brake system comprising; a housing having an internal bore terminating in an enclosure; a plunger slidably disposed within said bore and having an operating portion for controlling said fluid pressure; a diaphragm assembly reciprocably mounted in said enclosure and operatively coupled to said plunger for controlling the movement thereof in said bore; said diaphragm assembly partitioning said enclosure into first and second pressure chambers; means for reciprocating said diaphragm assembly in said enclosure in response to the generation of control signals, said reciprocating means including a vacuum source, means for normally communicating said first and second pressure chambers to said vacuum source and compound valve means for venting said first pressure chamber to ambient fluid pressure and interrupting communication between said first pressure chamber and said vacuum source in response to the generation of at least one of said control signals; an expansion chamber in fluid communication with said first pressure chamber; and a flow restricting member for providing fluid communication between said expansion chamber and said second pressure chamber, said flow restricting member having a flow orifice for providing a variable flow rate which decreases as the pressure differential across said member increases.

9. The apparatus of claim 8 wherein said flow restricting member comprises a flexible partition mounted at the end of said expansion chamber and in which said flow orifice is in communication with said second pressure chamber.

10. The apparatus of claim 8 wherein said compound valve means comprises a venting aperture; a first valve means for normally closing said venting aperture; a vacuum aperture; second valve means for normally opening said vacuum aperture; a control cavity communicating with said apertures and said first pressure chamber; and means for operating said first and second valve means to an alternate position wherein said venting aperture is open and the vacuum aperture is closed.

* * * * *